United States Patent [19]

Blakley et al.

[11] Patent Number: 5,568,975
[45] Date of Patent: Oct. 29, 1996

[54] SELF-ADJUSTING STEADY BEARING SUPPORT ASSEMBLY AND SUSPENSION

[75] Inventors: Robert Blakley; Marlin Schutte, both of Rochester, N.Y.

[73] Assignee: General Signal Corporation, Stamford, Conn.

[21] Appl. No.: 582,688

[22] Filed: Jan. 4, 1996

[51] Int. Cl.$^6$ ........................................... B01F 7/00
[52] U.S. Cl. ............................................. 366/285; 366/331
[58] Field of Search ..................................... 366/285, 286, 366/279, 281, 282, 289, 331, 348, 349

[56] References Cited

U.S. PATENT DOCUMENTS

| | | | |
|---|---|---|---|
| 3,011,768 | 12/1961 | Clark | 366/282 |
| 3,697,053 | 10/1972 | Will | 366/281 |
| 4,565,453 | 1/1986 | Jekat et al. | |
| 4,671,872 | 6/1987 | Cramer | 366/285 |
| 5,088,832 | 2/1992 | Gambrill et al. | |

Primary Examiner—Robert W. Jenkins
Attorney, Agent, or Firm—M. Lukacher

[57] ABSTRACT

A steady bearing on a mixer shaft in a vessel supported from the walls of the vessel by a plurality of pairs of parallel struts which are pivotably mounted at their ends in fixed parallel clevises, the inner clevises being included in a bearing support subassembly and the outer clevises being attached to the vessel wall. The struts and clevises define a plurality of supportive parallelogram structures. The steady bearing is free to slide axially along the mixer shaft. As the vessel expands or contracts in response to changes in internal pressure or temperature as required by process conditions, the shape of the parallelogram structures is free to change to lengthen or shorten the parallelogram diagonals, and in response the steady bearing moves to a new position along the shaft. Radial support of the bearing is maintained at all axial positions assumed by the bearing. The inner clevises are mounted on a clevis carrier which is attached to the bearing holder only through rings at the top and bottom of the holder. The struts and clevises are provided with cooperating faces which can interfere in the event of mechanical failure of the pivot pins to arrest a loose strut and prevent it from catastrophically engaging the mixer impeller. In a similar fashion, this interference prevents the steady bearing assembly from dropping down the shaft, which due to the strut geometry, would cause the shaft to be pulled to the side causing failure of the shaft and/or its supporting components.

16 Claims, 7 Drawing Sheets

SELF-ADJUSTING STEADY BEARING SUPPORT ASSEMBLY AND SUSPENSION

The subject invention relates to assemblies for supporting bearings for mixer shafts in vessels, more particularly to such assemblies for bearings known collectively as "steady bearings" which are disposed on a mixer shaft at a distance from the driven end thereof, typically near a free end, and most particularly to an assembly for automatically maintaining radial support of a steady bearing despite dynamic changes in radial dimensions of the vessel.

A mixer shaft driving an impeller in a vessel can undergo substantial dynamic bending distortion during mixing operation, particularly when heavy or variable loads are imposed on the impeller such as when mixing solids or high viscosity materials. Dynamic distortion can cause fatiguing of the shaft material and can lead to permanent shaft deformation or outright failure. In some applications, satisfactory shaft control can be obtained by constraining the free end of the shaft below the impeller in a steady bearing assembly fixed to the bottom of the vessel, as disclosed for example in U.S. Pat. No. 5,088,832 issued Feb. 18, 1992 to Gambrill et al. Even when so constrained, however, the shaft can display undesirable and potentially catastrophic bending moments at one or more places along the shaft, especially in relatively deep vessels having relatively long shafts with multiple impellers. It is known to provide one or more intermediate steady bearings along the shaft, preferably at bending antinodes, to further support the shaft from radial deformation.

Figure 1:
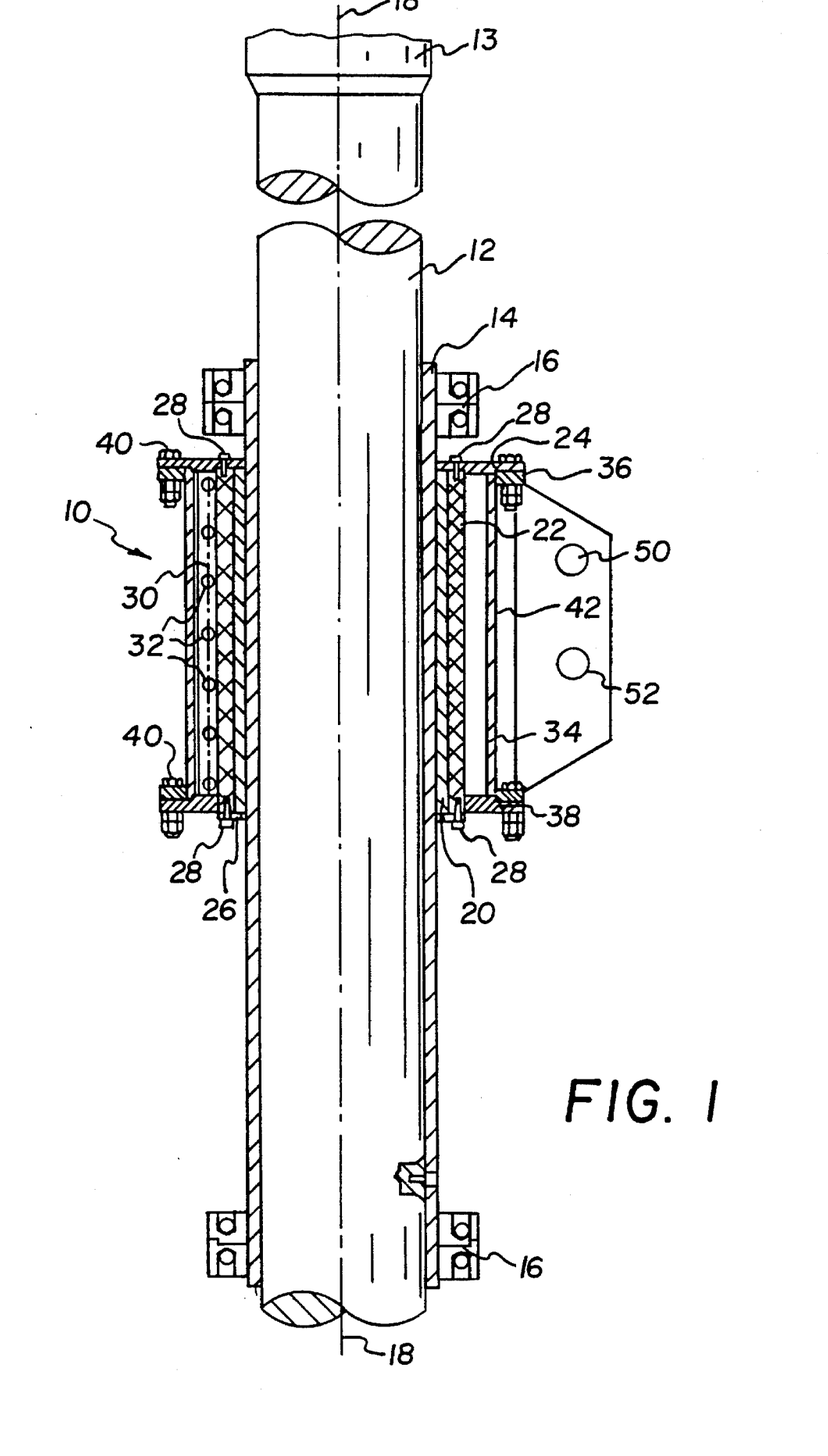
FIG. 1 is an elevational view, partially in cross-section along Line 1—1 in FIG. 2, showing a mixer shaft and a portion of a steady bearing support assembly in accordance with the invention.

An intermediate steady bearing can be supported by one or more rigid struts extending from the wall of the vessel, as shown, for example, as item 24 in FIG. 1 of U.S. Pat. No. 4,565,453 issued Jan. 21, 1986 to Jekat et al. Such rigid struts can provide adequate support when the mixing system is used at ambient temperatures and pressures, so that there is no expansion or contraction of the struts, shaft, or vessel. However, a serious problem can arise when the use conditions differ markedly from the conditions of installation of the steady bearing support assembly. Particularly at high temperatures and high pressures, the vessel can become significantly inflated, resulting in an increase in the vessel radius. Support assemblies employing rigid struts of fixed length can fail by extension failure of the struts, by gross deformation of the steady bearing itself, and/or by tearing of the vessel wall. Such failure can be very costly and can also be highly dangerous to human operators.

Thus, it is desirable to provide an assembly which can support a steady bearing continuously while tolerating variation in the radius of the vessel, that is, the distance from the axis of the mixer shaft to the vessel wall. One known approach is to connect the supporting struts to the wall with heavy springs. However, the spring constant required to control the shaft may be so high, for example, greater than 500,000 pounds/inch, that the cylindricality of the bearing is distorted, resulting in premature failure of the bearing. Another known approach is to use three tension/compression struts equilaterally arrayed about the bearing, pivotably connected at both the bearing and the wall, and forming non-right angles am the bearing and wall. Such an assembly can accommodate changes in vessel diameter by allowing the bearing to slide axially up or down the shaft as needed. This assembly has am least two serious drawbacks. First, if one of the struts fails, for example, by breaking of the strut or by loosening or failure of the articulating pin at either the bearing or the wall, the assembly can no longer center the shaft and may be rapidly destroyed by the now-permitted shaft excursions. Second, the performance of the bearing depends on the coincidence of the line of action of the struts and the control of the active steady bearing. Otherwise there can be different moments exerted on the bearing, resulting in rapid wear and premature failure.

It is a principal object of the invention to provide an improved steady bearing assembly for a mixer shaft wherein the bearing is continuously constrained from movement in a radial direction by being permitted to move in an axial direction along the shaft while being maintained by the assembly in coaxial alignment with the shaft.

It is a further object of the invention to provide an improved steady bearing assembly wherein failure of an assembly strut will not result in decentering of the bearing and catastrophic failure of the assembly.

It is a still further object of the invention to provide an improved steady bearing assembly wherein centering forces on the assembly struts are distributed over the bearing and do not cause deformation of the bearing.

Briefly described, a steady bearing assembly for a mixer shaft in accordance with the invention includes a cylindrical bearing holder surrounding the mixer shaft and supporting the steady bearing over substantially its entire outer load-bearing surface. The bearing holder is provided at its upper and lower ends with a stout ring encircling the shaft and being capable of withstanding the radial loads imposed on the assembly during operation without significant deformation. Preferably, the bearing, bearing holder, and rings are of a split design for ease of disassembly and bearing replacement without affecting the alignment of the remainder of the assembly and without the need for removal of the impeller(s) from the shaft. Between the upper and lower rings, and outboard of the bearing holder, are fixedly attached a plurality of elongated first clevises, preferably three arranged equilaterally about the bearing holder. Each clevis is attached only to the upper and lower rings, and not to the bearing holder directly. Radial loads on the clevises are thereby prevented from exerting deformational forces on the bearing holder and the bearing. Each clevis has a first pair of bores through its limbs, one bore above the other transverse to a line parallel to the axis of the mixer and the bearing. Between the clevis limbs are disposed a pair of equal length struts, also one above the other, the inner ends of which are pivotably secured to the clevises by pins or shoulder bolts. The outer ends of each pair of struts are pivotably secured to a second clevis at the vessel wall similar to the first or inner clevis, the second clevis having a second pair of bores identical in orientation to the first pair of bores in the first clevis. Each of the pairs of struts thus functions as a parallel link suspension frame in which the vertical parallel sides (between the holes in the inner and outer clevises) remain parallel to the axis of the shaft while the diagonals and included angles of the parallelogram change to accommodate changes in the radius of the vessel by allowing the bearing to slide axially along the mixer shaft. The plurality of parallel links thus cooperate to keep the steady bearing centered and aligned with the shaft while continuously sustaining all variations in radial load on the shaft.

A very high degree of alignment is desirable. Installation alignment of the assembly with the mixer shaft is established first by aligning the bores in the outer clevises so that the centerlines of both bores in a clevis are equidistant from the surface of the shaft. Preferably, each pair of struts is pivotably fastened to the vessel wall by means of a mounting subassembly to facilitate this alignment. To accommodate lack of cylindricality in the vessel wall, each outer clevis may be provided with a threaded bore and may mount onto a threaded clevis stub shaft having a plate attachable to the vessel wall. The distance of the clevis from the mixer shaft may then be adjusted by appropriate rotation of the clevis on the stub shaft prior to installation of the struts. A threaded locking ring may also be included on the stub shaft to prevent later rotation of the clevis. It may be desirable to tack weld the locking ring to the stub shaft when alignment is complete. To accommodate mounting of the planar stub shaft plate onto the cylindrical vessel wall and to locally reinforce the wall, a planar stud or bolt pad may be welded to the wall to receive the stub shaft plate. To accommodate small but significant deviations of the welded stud pad from normality to the mixer shaft radius, an adapter which is tapered across its diameter may be included between the stub shaft plate and the stud pad. Rotation of this tapered adapter serves to change the orientation of the outer clevis and permits accurate vertical alignment of the pivot bores. A disc-shaped plate (also called a blend flange) boltable to the stud pad may be provided over the stub shaft plate to secured the entire subassembly, properly aligned, to the vessel. Preferably, one or both ends of each strut is threaded onto the center portion of the strut to permit fine adjustment of the assembly during and after installation of the struts. It is essential that each pair of struts and each pair of clevises be adjusted to cooperate to form a true parallelogram with its two vertical sides parallel to the axis and surface of the mixer shaft.

In an alternate embodiment which may be easier to assemble and align, the mounting subassembly may be installed on a stud pad provided on the outer surface of the vessel wall, and the clevis stub shaft may be lengthened to protrude into the interior of the vessel through an opening in the vessel wall. In this embodiment, a gasket, such as a commercially-available spiral wound gasket, may be required between the tapered adapter and the stud pad.

Preferably, the outer clevis is provided with an inner face normal to a radius of the mixer shaft, and each strut is provided near its outer end with a face bevelled from the strut axis at an angle substantially equal to the angle of non-orthogonality of the struts from the mixer shaft. Thus the clevis face and the strut face are substantially parallel and nearly in contact during normal operation of the steady bearing support assembly. In the event the pivot pin should break or work free, the strut can drop only a short distance before the upper corner of the strut face contacts the clevis face, preventing the strut from swinging downwards into catastrophic collision with the mixer impeller. If any one strut should fail thusly, the parallelism remaining in the other two strut pairs will maintain the alignment of the bearing with the mixer shaft.

The foregoing and other objects, features, and advantages of the invention, as well as presently preferred embodiments thereof, will become more apparent from a reading of the following description in connection with the accompanying drawings in which.

Figure 2:
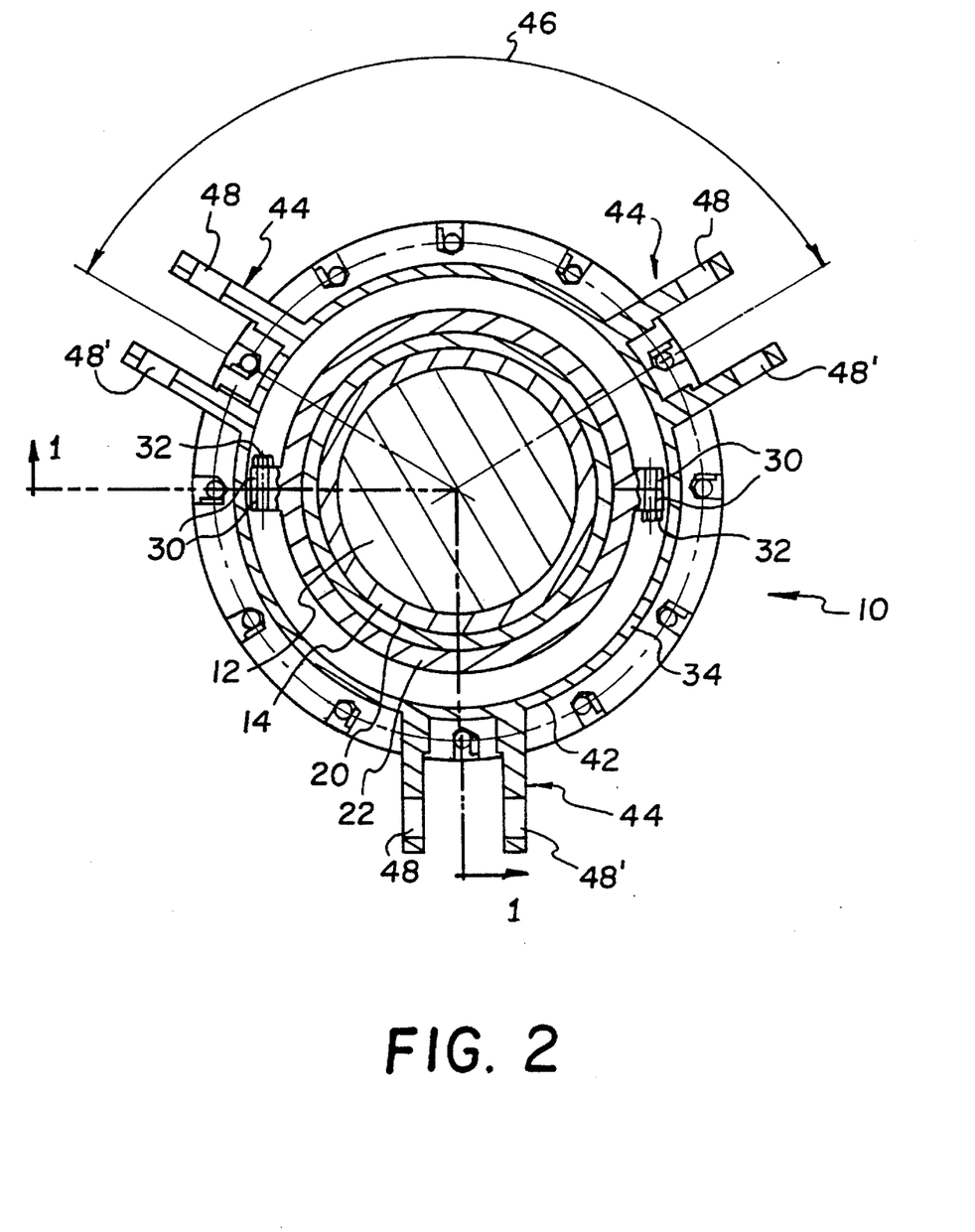
FIG. 2 is a composite cross-sectional view of the apparatus shown in FIG. 1.
Figure 3:
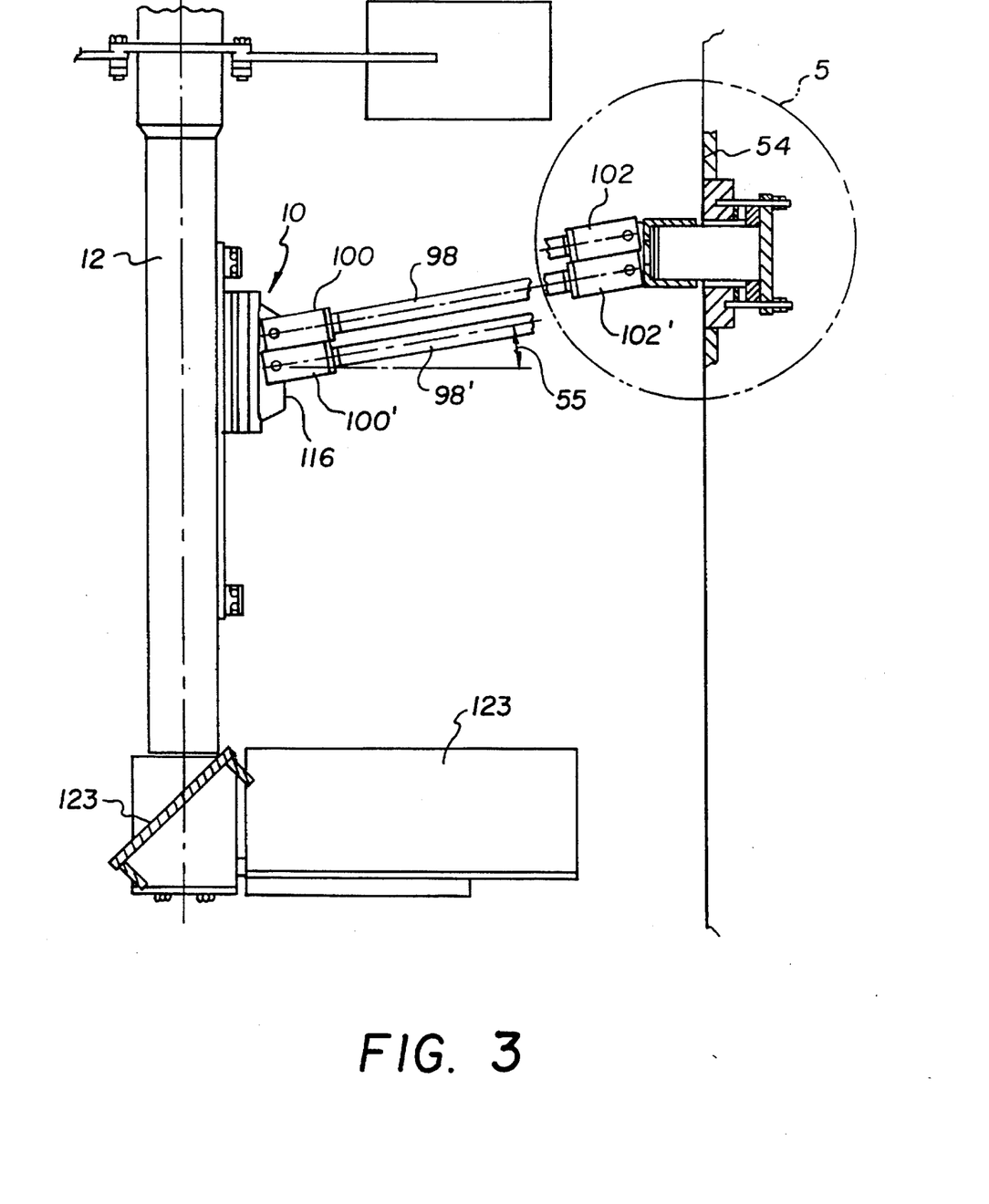
FIG. 3 is an elevational view, partially in crosssection, showing the steady bearing apparatus of FIG. 1 connected by a pair of parallel struts to a mounting subassembly at the wall of the vessel.
Figure 4:
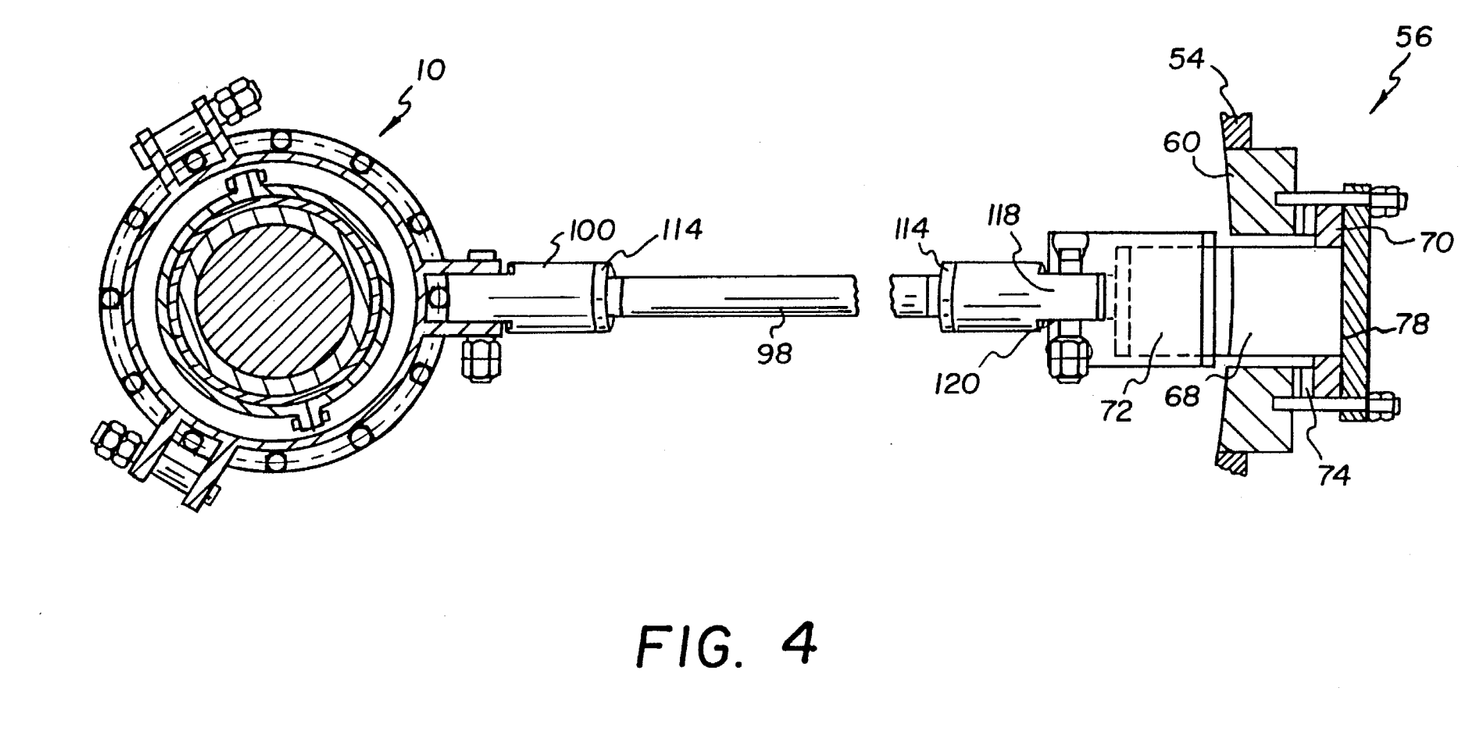
FIG. 4 is a cross-sectional view of the apparatus shown in FIG. 3.
Figure 5:
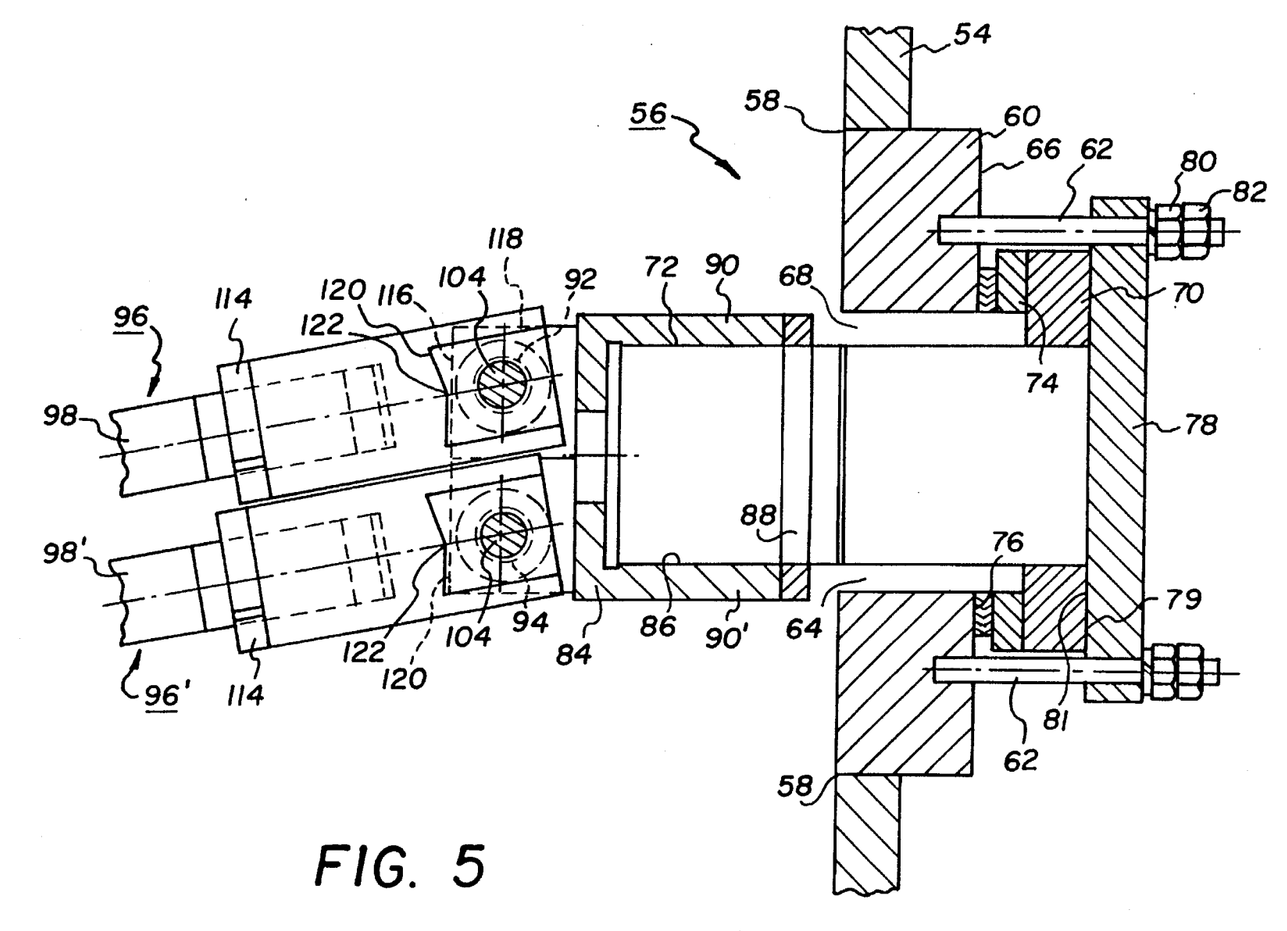
FIG. 5 is a detailed vertical cross-sectional view of the area within Circle 5 in FIG. 3.
Figure 6:
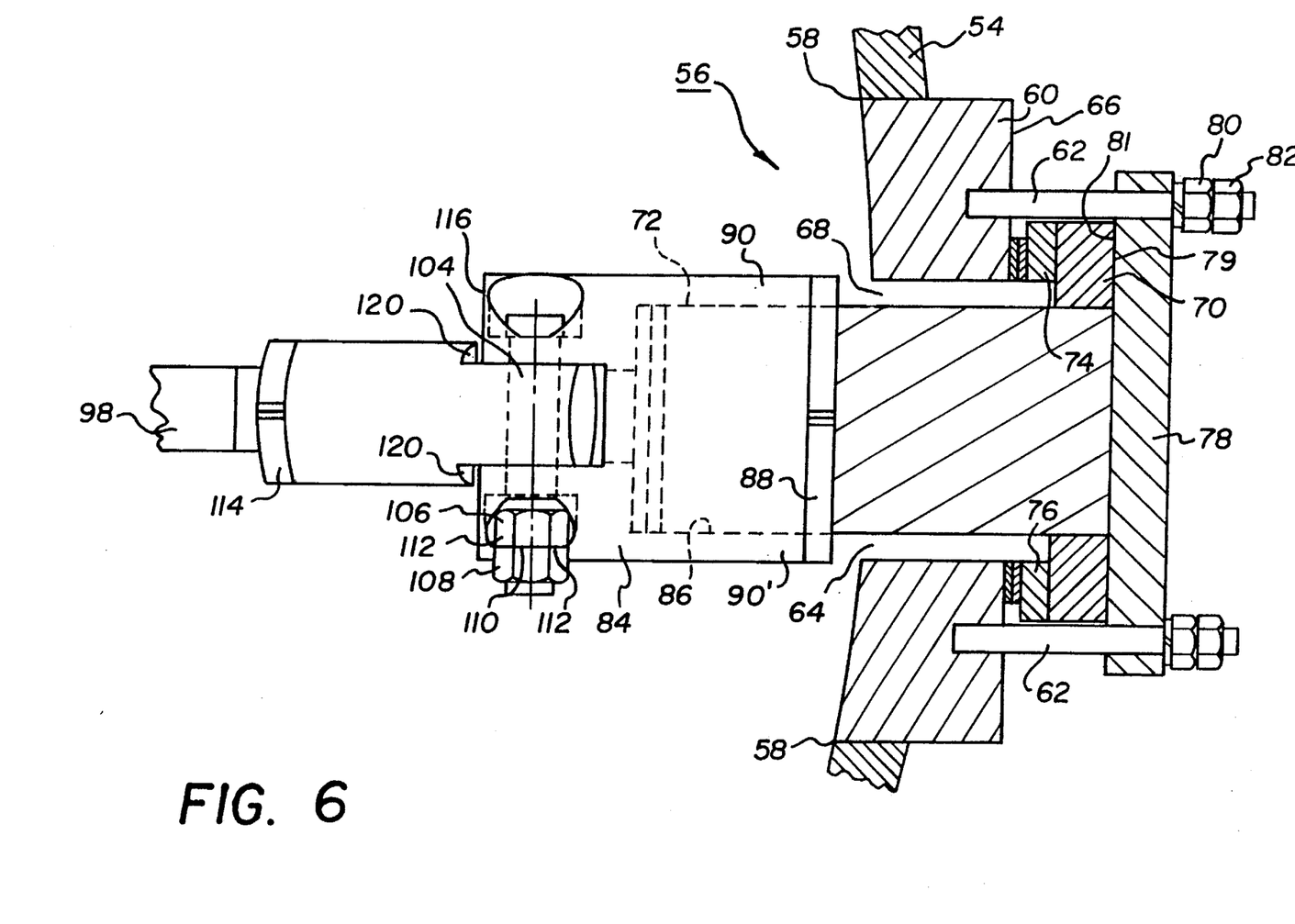
FIG. 6 is a horizontal cross-sectional view of the apparatus shown in FIG. 5.

Referring to FIGS. 1 and 2, a steady bearing subassembly 10 is shown disposed on a mixer shaft 12 having a wear sleeve 14 which is preferably a split cylinder clamped to shaft 12 by clamps 16. Shaft 12 is adapted to be rotationally driven at its upper end 13 by a mixer drive (not shown), and has an axis 18 which can be useful as a reference in designing and installing apparatus in accordance with the invention. Wear sleeve 14 extends longitudinally along shaft 12 over at least the range of axial movement of subassembly 10 in normal operation of the apparatus, as described hereinbelow.

Bushing 20 is a cylindrical bushing in operational contact along its inner surface with wear sleeve 14 and is adapted to function as a steady bearing to constrain radial loads imposed by bending of shaft 12 during operation of the mixer. Bushing 20 may be formed from any well-known bushing material such as bronze, polymer, carbon graphite or ceramic. Preferably, bushing 20 is formed from carbon graphite and does not require lubrication. A bushing holder 22 surrounds and supports bushing 20 and is fitted at its upper and lower ends with upper and lower rings 24 and 26, respectively, which are connected to holder 22 by a ring of bolts 28. Preferably, bushing 20, holder 22, and rings 24 and 26 are of longitudinally split design, holder 22 being provided with mating flanges 30 which may be secured together by bolts 32. Preferably, rings 24 and 26 also have flanges and bolts (not shown) for assembly. The split design of these components permits disassembly and replacement of the shaft bushing 20 without disassembly and loss of critical alignment of the rest of the steady bearing support assembly as described hereinbelow.

Rings 24 and 38 extend radially beyond holder 22 and receive therebetween a cylindrical clevis carrier 34 having circular upper and lower flanges 36 and 38 which are attached to rings 24 and 26, respectively, by bolts 40. Attached to the outer surface 42 of carrier 34 (but not to rings 24 and 26), as by welding, are a plurality of inner clevises 44, preferably three arranged equilaterally about the mixer axis 18 with 120° angles 46 therebetween. Each clevis 44 has limbs 48 and 48' oriented longitudinally parallel to mixer axis 18, and has upper and lower bores 50 and 52 through both limbs. The axes of bores 50 and 52 are in a direction perpendicular to the direction of mixer axis 18 and are included in a plane which is parallel to axis 18.

Since clevis carrier 34 is connected only to upper and lower rings 24 and 38 and not directly to bushing holder 22, radial loads on the clevises are borne uniformly by the rings and are transferred uniformly to all portions of the bushing holder, thus preventing the unwanted distortion of the bushing experienced by some known steady bearing assemblies.

Referring to FIGS. 3 through 6, mixer shaft 12 and steady bearing subassembly 10 are disposed preferably vertically in a vessel having a wall 54 which is substantially parallel to mixer axis 18. Preferably, wall 54 is substantially cylindrical and coaxial with axis 18 so that the mixer shaft is centered in the vessel, although other configurations are possible. In the preferred embodiment shown in FIGS. 3 through 6, a mounting subassembly 56 is mounted in an opening 58 in wall 54. One mounting subassembly is provided for each inner clevis, disposed collectively in a plane above or below the plane which includes the inner clevises so the supporting strut arms, as described hereinbelow, will form an included angle 55 with either plane of between 1° and 20°, preferably about 10°. Subassembly 56 includes an annular pad 60 attached as by welding to wall 54 and is tapped to receive a plurality of threaded studs 62. Pad 60 is provided with a bore 64 communicating between the interior and the exterior of the vessel. Preferably the planar outer surface 66 of pad 60 is disposed substantially parallel to mixer axis 18. A cylindrical clevis stub shaft 68 having, orthogonal to stub shaft 68, a circular base plate 70 which extends inwardly of the vessel through bore 64 and is threaded over a portion 72 of its surface. Between plate 70 and surface 66 is disposed an annular adapter ring 74 which is slightly tapered across its diameter. Tapered adapter ring 74 can be rotated during installation and adjustment of the assembly to rotate the angle between the base plate and the stud pad and thereby to orient the axis of the stub shaft to transect mixer axis 18. A gasket 76 may be needed between ring 74 and pad surface 66. A backing plate 78 has bores to receive studs 62. An annular rabbet 79 in plate 78 receives a raised annular rim 81 on base plate 70 whereby the stub shaft is centered in bore 64. Nuts 80 and locking nuts 82 secure the assembly with the stub shaft properly centered and oriented.

Mounted on clevis stub shaft 68 is outer clevis 84, which has an axial bore 86 threaded over its inner surface to mate with threaded portion 72 of the stub shaft. During installation and adjustment of the mounting subassembly, the clevis can be rotated on the stub shaft threads to adjust the distance of the clevis from the mixer axis. When the proper distance is achieved and the clevis is properly oriented with respect to the inner clevis 44, the outer clevis can be locked in place by locking ring 88, which then may be tack welded to prevent unwanted loosening.

Outer clevis 84 has a pair of limbs 90 and 90' having opposed parallel flats on their inner surfaces and having upper and lower bores 92 and 94 identical in spacing with bores 50 and 52 in inner clevis 44. The spacing between limbs 90 and 90' is substantially the same as the spacing between limbs 48 and 48' on the inner clevis. Bores 92 and 94 are also aligned like bores 50 and 52 so that their axes are normal to the direction of the mixer axis and are included in a plane parallel to the mixer axis. The four axes of bores 50, 52, 92, and 94 thus define the four corners of a parallelogram in which the two vertical sides are parallel to the axis of the mixer.

A pair of identical strut arms 96 and 96' having a center portion 98 and 98', an inner end portion 100 and 100', and an outer end portion 102 and 102', are disposed one above the other with their respective inner and outer ends between the limbs of the inner and outer clevises. The end portions are bored, and the struts are pivotably connected to the clevis limbs by shoulder bolts 104, nuts 106, and locking nuts 108. Preferably, locking shims 110 are included under the locking nuts, and alternating tabs 112 are bent up or down to maintain the lock between the nuts. These locking features are preferably included to prevent accidental loss of integrity of the assembly during operation, which can result in catastrophic failure of the mixer shaft and rupture of the vessel.

At least one of the end portions of the strut arms, and preferably both, is threaded onto the center portion to permit fine adjustment of the length of each strut arm during assembly. A locking ring 114 is provided to prevent further rotation after adjustment, which ring may also be tack welded to the strut arm in permanent installations.

Figure 7:
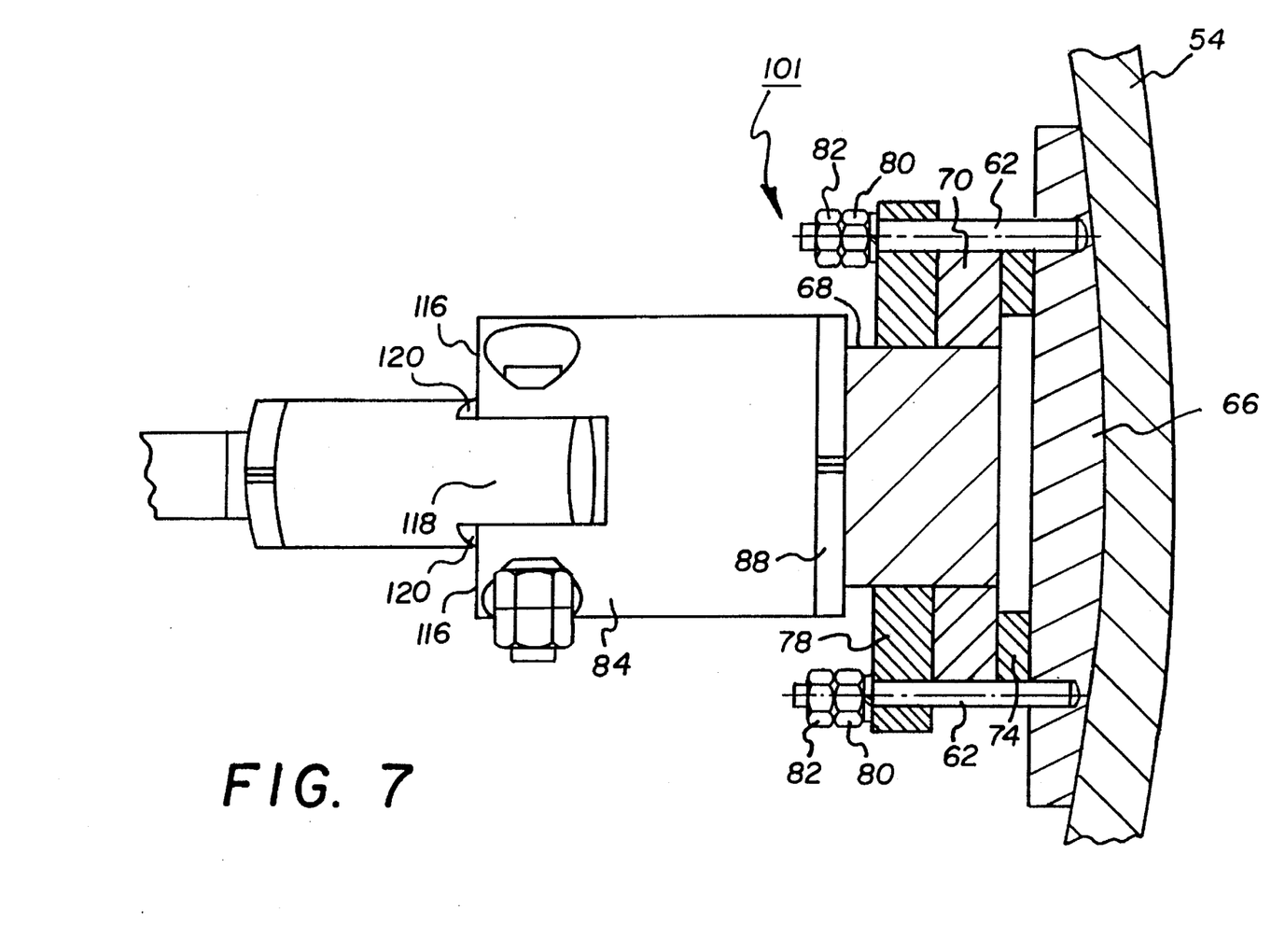
FIG. 7 is a cross-sectional view like that of FIG. 5 showing another embodiment of a mounting subassembly in accordance with the invention.

A second embodiment 101 of a mounting subassembly is shown in FIG. 7. Embodiment 101 contains all the elements of subassembly 56 but is disposed on the inner surface of the vessel wall rather than the outer surface and does not protrude through a bore in the vessel wall. In practice, embodiment 56 may be preferable for ease of setup and adjustment, but embodiment 101 can provide equivalent service. In FIG. 7, components analogous to those in embodiment 56 are provided with the same item numbers.

Preferably, the clevises and struts are provided with features to prevent a strut from falling into catastrophic engagement with the mixer impeller 123 if a bolt 104 should work loose or should fail during operation of the mixer. The end faces 116 of the inner and outer clevis limbs 48, 48', 90, and 90' are formed as flats substantially parallel to the axis of the mixer. The threaded inner and outer strut ends are formed from round stock with the portions adjacent to the bores flattened as by milling to provide a tabular end 118 for insertion between the limbs of the clevises. Preferably, the transitions between the surfaces of the tabular end and the round portion are a pair of faces 120 normal to the surface of tabular end 118 and disposed at an included angle to the axis of the strut equal to the included angle 55 between the strut and the clevises. Thus one of faces 116 and face 120 are substantially parallel and in close proximity but not touching. On each strut end, faces 120 meet to define a corner 122. If a shoulder bolt 104 in an outer clevis should fail, the strut end can drop only until corner 122 strikes face 116, preventing further descent. Although the parallel linkage of that particular strut pair is then disabled, the remaining two parallel link frames will be unimpaired and radial support of the bushing will be maintained.

For operation, the entire steady bearing support assembly is installed as described hereinabove. When the vessel is charged and a process cycle is begun, the vessel may respond to changes in pressures and temperatures by expanding or contracting in volume, and the internal dimensions of the vessel may change from what they were at ambient conditions. If the apparent inner radius of the vessel increases or decreases, the mounting subassemblies will be moved farther from or nearer to the axis of the mixer. In response, the struts in the parallel link frames of the support assembly will pivot about their bolts 104 to shorten or lengthen the diagonals of the parallelogram, causing the steady bearing subassembly 10 to slide up or down the mixer wear sleeve 14 in the direction parallel to the mixer shaft and surface. For every combination of distances of each of the three mounting subassemblies from the mixer axis, there can be one and only one resultant axial location for the bearing support subassembly. This coaxial movement of subassembly 10 to its mandated new position on the mixer shaft occurs without any change in radial stiffness or support by the struts, and therefore the bushing and shaft remain radially constrained at all times.

From the foregoing description it will be apparent that there has been provided an improved self-adjusting steady bearing support assembly for mounting on the wall of a vessel, whereby a mixer shaft can be constrained from radial excursions despite changes in distance of the mixer shaft from the vessel wall. Variations and modifications of the herein described steady bearing support assembly, in accordance with the invention, will undoubtedly suggest themselves to those skilled in this art. Accordingly, the foregoing description should be taken as illustrative and not in a limiting sense.

What is claimed is:

1. An assembly for supporting a steady bearing for a mixer shaft in a vessel by allowing axial movement of said bearing along said shaft in response to changes in radial dimensions of said vessel while maintaining coaxial alignment of said bearing with said shaft and radial support of said shaft, said assembly being supported from a wall of said vessel, said assembly comprising:

a) a bearing holder for containing and positioning said bearing in coaxial rotational contact with the surface of said shaft; and b) a plurality of pairs of struts disposed radially about said shaft for supporting said bearing holder within said vessel, each of said pairs of struts forming a parallel link suspension and i) extending between and being pivotably connected at an inner end thereof to said bearing holder and at an outer end thereof to said wall of said vessel, ii) having first and second struts of equal length disposed parallel to each other in a plane which includes the axis of the mixer shaft, iii) being non-orthogonal to said mixer shaft in the shaft axial direction, and iv) having the pivot axes of connection of said struts to said bearing holder normal to the axial direction of the mixer shaft axis and being included in a plane parallel to said shaft axis, said plurality of strut pairs cooperating to maintain radial support of said bearing.

2. An assembly in accordance with claim 1 wherein said plurality of strut pairs are disposed at equal angular intervals about said bearing holder.

3. An assembly in accordance with claim 1 wherein the number of said strut pairs is three.

4. An assembly in accordance with claim 1 wherein each of said struts forms an angle to the axis of said mixer shaft of between about 1° and about 30°.

5. An assembly in accordance with claim 1 further comprising a wear sleeve on said mixer shaft within said steady bearing.

6. An assembly in accordance with claim 1 wherein said bearing holder comprises:

a) a cylindrical member for supporting said bearing on an outer surface thereof;

b) first and second ring members disposed at opposite ends of said cylindrical member and attached thereto; and c) a plurality of first clevises equal in number to the number of strut pairs, said first clevises being radially disposed between and attached to said first and second ring members, each of said first clevises having opposed limbs and having a pair of parallel bores through each of said limbs, the axes of said bores being spaced apart by a first distance and being included in a plane parallel to the axis of said mixer shaft.

7. An assembly in accordance with claim 6 wherein each of said struts comprises an elongate central member and first and second end members attached to the inner and outer ends, respectively, of said central member, each of said end members having first bores therethrough.

8. An assembly in accordance with claim 7 wherein at least one of said ends of said central member is threaded, and wherein at least one of said end members contains a second bore orthogonal to said first bore and threaded to receive said threaded central member to allow adjustment of the distance between said first bores in said first and second end members.

9. An assembly in accordance with claim 8 further comprising a threaded locking ring disposed on said threaded central member for preventing rotation of said threaded end member.

10. An assembly in accordance with claim 7 wherein each of said end members has first and second opposing and parallel flats in a region thereof surrounding and normal to said first bores, the thickness of said end members between the flats being substantially equal to the distance between said opposed limbs of said clevises.

11. An assembly in accordance with claim 10 further comprising a plurality of mounting subassemblies attached to said vessel wall equal in number to the number of said strut pairs for receiving and securing said outer ends of said struts, each of said mounting subassemblies having a) a second clevis having opposed limbs and a pair of parallel first bores through each of said limbs and a threaded blind second bore normal to the direction of said first bores;

b) a stub shaft threaded over a portion of its outer surface to mate with said threaded blind second bore to permit adjustment of the distance of said second clevis from said first clevis, said stub shaft having a base plate;

c) a beveled adjustment ring disposed between said stub shaft base plate and said vessel wall, said ring being rotatably adjustable to alter the angle of said base plate to said vessel wall and thereby to adjust the position of said axes of said first bores in said second clevis to be both orthogonal to the direction of the axis of said mixer shaft and included in a plane parallel to the axis of said mixer shaft; and d) a backing plate disposed over said shaft base plate and securable to said wall to attach said mounting subassembly to said vessel wall.

12. An assembly in accordance with claim 11 wherein each of said parallel strut pairs is connected to one of said first clevises on said bearing holder and one of said second clevises in said subassemblies, said inner and outer ends of said struts being disposed in said first and second clevises respectively and being pivotably secured therein by shoulder bolts through said respective bores in said strut end members and said clevises.

13. An assembly in accordance with claim 12 wherein said first and second flats terminate at the inner ends thereof in first and second faces, respectively, said faces being orthogonal to said flats and non-orthogonal to the axis of said strut and meeting in a corner, said corner being in close proximity to a third face on said second clevis and being disposed to interfere with said third face upon removal of said shoulder bolt connecting said strut end to said second clevis.

14. An assembly in accordance with claim 11 wherein said stub shaft base plate, said beveled adjustment ring, and said backing plate are disposed on the outside of said vessel, and said stub shaft and said second clevis intrude into the interior of said vessel through an opening in said vessel wall.

15. An assembly in accordance with claim 14 further comprising a stud pad attached to said vessel wall for receiving studs for attaching said subassembly to said vessel.

16. An assembly in accordance with claim 15 further comprising a gasket between said beveled adjustment ring and said stud pad.

* * * * *